United States Patent
Rapeli

[11] Patent Number: 6,103,417
[45] Date of Patent: Aug. 15, 2000

[54] FLAT ELEMENTARY ELECTROCHEMICAL CELL AND PRECURSOR ELEMENT

[75] Inventor: Juha Rapeli, Change Cedex, France

[73] Assignee: U.S. Philips Corporation, New York, N.Y.

[21] Appl. No.: 09/115,893

[22] Filed: Jul. 15, 1998

[30] Foreign Application Priority Data

Jul. 22, 1997 [FR] France .................................. 97 09293

[51] Int. Cl.[7] ........................... H01M 2/18; H01M 10/16
[52] U.S. Cl. ........................ 429/145; 429/143; 429/144; 429/162; 429/208
[58] Field of Search ..................................... 429/162, 127, 429/129, 130, 142, 143, 144, 145, 146, 208

[56] References Cited

U.S. PATENT DOCUMENTS 4,996,128  2/1991  Aldecoa et al. ..................... 429/153
5,288,565  2/1994  Gruenstern ......................... 429/153

FOREIGN PATENT DOCUMENTS

| 0296623A2 | 12/1988 | European Pat. Off. . | |
| 917676 | 2/1947 | France . | |
| 53-041735 | 4/1978 | Japan | H01M 2/04 |
| 59-148280 | 8/1984 | Japan | H01M 6/46 |

*Primary Examiner*—Maria Nuzzolillo
*Assistant Examiner*—Jonathan Crepeau
*Attorney, Agent, or Firm*—Dicran Halajian

[57] ABSTRACT

The invention discloses a flat elementary electrochemical cell including first and second electrode foils between which there are two layers of permeable separator material for an electrolyte under pressure. According to the invention, this cell includes a non-conductive fastening system of the electrode foil and layer(s) of separator material for pressing them together. The invention also discloses a precursor element for realizing one or various such cells and a flat accumulator element including at least one such cell.

9 Claims, 4 Drawing Sheets

FLAT ELEMENTARY ELECTROCHEMICAL CELL AND PRECURSOR ELEMENT

DESCRIPTION

FIELD OF THE INVENTION

The invention relates to a flat elementary electrochemical cell, a precursor element for such a cell and a flat accumulator element including such a cell.

The invention finds its application in the manufacture of rechargeable batteries. The object of the invention is used in portable apparatus such as mobile telephone terminals.

BACKGROUND OF THE INVENTION

A lead-acid unit cell battery and a sealed envelope for containing it and forming a flat accumulator element are already known from European patent application EP 0 296 623 (Sealed lead-acid battery). This document teaches that a lead-acid unit cell comprises positive and negative electrode plates and a sulfuric acid impregnated separator. A flat accumulator element including such a unit cell comprises a flat casing, hermetically sealed with, however, a safety valve for evacuating the gas surplus occasionally produced by electrochemical reactions.

Such a flat accumulator is to solve three main problems. A first problem is that the electrochemical cell is to be enclosed in a substantially flat and thin and sealed envelope, that is to say, an envelope that does not allow external gases to penetrate and does not allow the sulfuric acid to escape which would degrade the performance of the charging/discharging cycles.

According to cited document, this problem is solved by a flat casing containing the elementary electrochemical cell and having a very thin cover sealed by special sealing means.

A second problem is that the flat accumulator is to be very thin. According to cited document, the very thin cover of the flat casing contributes to solving this problem. A third problem is that the electrochemical cell is to be subjected to an internal overpressure so that normal electrochemical reactions occur. According to cited document, this problem is solved by adding to the first casing a second flat stiffening casing which may be made of metal or steel and whose flat stiffening walls show a resistance and sufficient rigidity for withstanding the required pressure while they are thinnest possible.

Worded differently, according to cited document, it is the flat casing and particularly the planar walls of the flat stiffening casing which ensure the function of exerting the necessary pressure for the proper operation of the electrochemical cell. Under these conditions, it is not possible to obtain an accumulator element that has a thickness that is smaller than or about equal to 2 mm, because said planar walls of the stiffening casing would become too thin and could not ensure their function at any rate by using current and reasonably priced materials in the industry.

SUMMARY OF THE INVENTION

It is an object of the present invention to propose an elementary electrochemical cell which is subjected to pressure means other than the pressure provided by the planar walls of the casing of the flat accumulator.

This object is achieved by a flat elementary electrochemical cell including a first and a second electrode foil between which there is at least one layer of separator material permeable to an electrolyte under pressure, characterized in that the elementary electrochemical cell comprises a non-conductive fastening system for fastening said electrode foils and (a) layer(s) of separator material for pressing them together.

An advantage of this fastening system is that it forms a means for applying the required pressure to the flat electrochemical unit cell without the aid of parts of the casing.

In a particular embodiment, this elementary electrochemical cell is characterized in that the separator material comprises at least a first and a second layer and in that the non-conductive fastening system comprises at least one non-conductive mechanical bonding layer permeable to the electrolyte and disposed between said layers of separator material, including at least one fastening of non-conductive material for pressing said electrode foils and layers of separator material against said mechanical bonding layer.

In a particular embodiment, this elementary electrochemical cell is characterized in that the mechanical bonding layer comprises a non-conductive support means for the fastening (s), said fastening(s) being formed respectively by a pair of transverse pins whose ends extend on either one of the two sides of said support means through said first layer of separator material and said first electrode foil on the one hand and through said second layer of separator material and said second electrode foil on the other, and the ends of the pins have means for pressing said layers of separator material and electrode foils against the bonding layer.

In this embodiment, the required pressure applied to the elementary electrochemical cell is very effective. More particularly, the thickness of the unit cell can become less than or equal to 0.6 mm.

Another object of the invention is to propose a precursor element for the manufacture of such a flat elementary cell.

This object is achieved by means of a precursor element for realizing one or various flat elementary electrochemical cells which are similar and have such a structure, characterized in that the precursor element comprises a mechanical non-conductive bonding layer in central position and on either one of the two sides of this central position a first layer of separator material and electrode foil and a second layer of separator material and electrode foil through which the pins of the support means of the bonding layer extend to fasten them and press them together, and characterized in that there is a sufficiently large surface for providing one or various flat elementary electrochemical cells by dividing parts each comprising at least one fastening system.

Another advantage of the fastening system according to the invention is that once the layers are pressed together, the precursor may be subdivided to advantageously form various elementary electrochemical cells without adding much work to the realization of a single elementary electrochemical cell.

It is another object of the invention to provide a flat accumulator element.

This object is achieved by means of an accumulator element comprising a flat casing, electric terminals of opposite polarity and at least such a flat electrochemical unit cell having connection means for connecting electrode foils and corresponding terminals.

With such an electrochemical unit cell, the flat accumulator does not of necessity have planar walls which are mechanically very resistant. The thickness of these planar walls may become very small and the flat accumulator may show a total thickness of less than or equal to 2 mm.

BRIEF DESCRIPTION OF THE DRAWINGS

These and other aspects of the invention will be apparent from and elucidated with reference to the embodiments described hereinafter.

In the drawings.

DESCRIPTION OF PREFERRED EMBODIMENTS

Figure 1A:
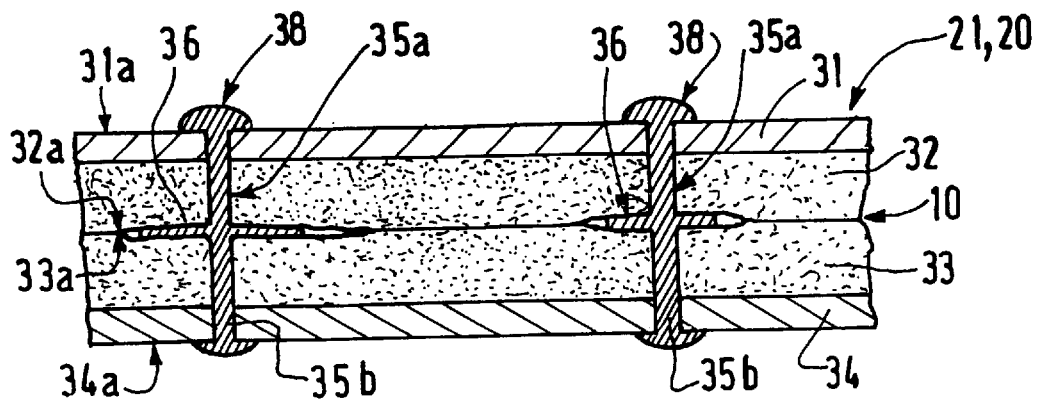
FIGS. 1A, 1B, 1C represent respectively in cross-sectional view parts of elementary electrochemical cells in three embodiments.
Figure 1B:
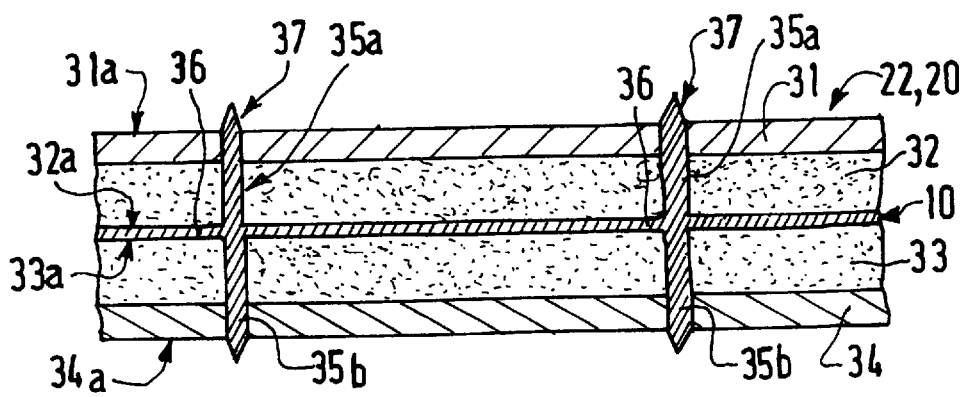
Figure 1C:
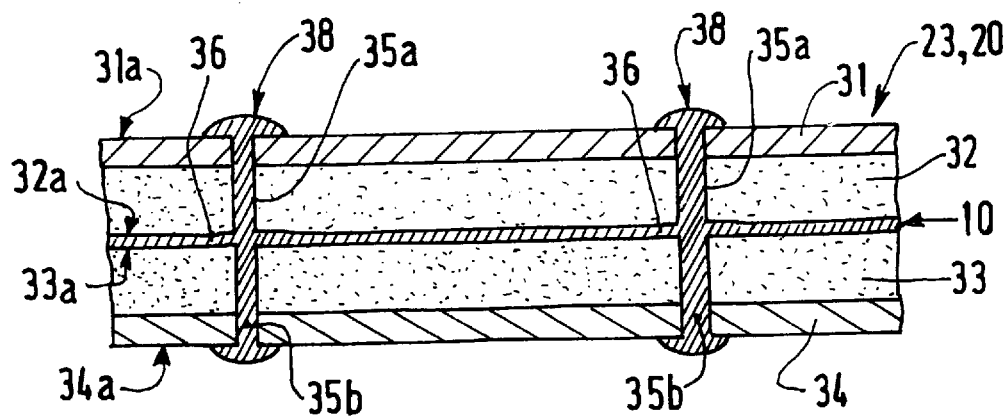

With reference to FIGS. 1A, 1B, 1C, a flat elementary electrochemical cell 20 comprises a first electrode foil 31 and a second electrode foil 34 for opposite electric polarities. Between these electrode foils there is at least one layer of separator material 32, 33 which is permeable to an electrolyte. It is indispensable for the operation of the electrochemical cell that this assembly of elements (electrode foils, separator material, electrolyte) is kept under a pressure that is higher than the atmospheric pressure and is contained in an envelope or a casing which, on the one hand, is impermeable to the electrolyte and, on the other hand, impermeable to external agents such as air and humidity.

According to the invention, the elements of the electrochemical cell are kept under pressure by means of a fastening system 11, 12 or 13 which is non-conductive.

In various examples of embodiment of a flat elementary electrochemical cell 20 which includes a fastening system described hereinafter, the separator material preferably comprises at least two layers or a pair of layers, where the layers are referenced first layer(s) 32 and second layer(s) 33, respectively. The fastening system comprises at least one conductive bonding layer 10 which is permeable to the electrolyte, disposed between the first and second layers of separator material 32, 33. The mechanical bonding layer 10 has at least one non-conductive fastening 35a, 35b, 38 for pressing the electrode foils 31, 34 and the layers of separator material 32, 33 against this bonding layer 10.

With reference to FIG. 1A and to the FIGS. 1B, 1C, the bonding layer 10 comprises a non-conductive support means 36 for at least one fastening 35a, 35b. Preferably, this fastening is formed by a couple of transverse pins of non-conductive material whose ends 37 extend on either one of the two sides of the support means 36 through the first layer of separator material 32 and the first electrode foil 31 on one side and through the second layer of separator material 33 and the second electrode foil 34 on the other. The ends of the pins have means 38 for pressing the layers of separator material and the electrode foils against the bonding layer.

As shown in FIG. 1B, the ends 37 of the pins extend for this purpose to beyond outer surfaces 31a, 34a of the electrode foils and including points. As shown in the FIGS. 1A and 1C after insertion through the foils and layers, the ends 37 are flattened on these outer surfaces and form blocking heads 38 for blocking purposes when the layers of separator material and electrode foils are pressed against the bonding layer 10.

Figure 2A:
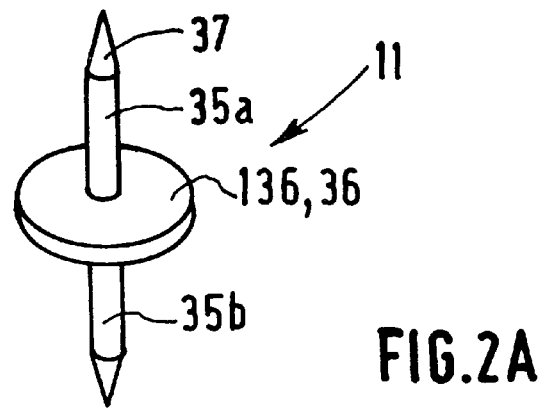
FIGS. 2A, 2B represent respectively in perspective and in cross-sectional view an elementary support for a pair of pins, for a mechanical bonding layer.
Figure 2B:
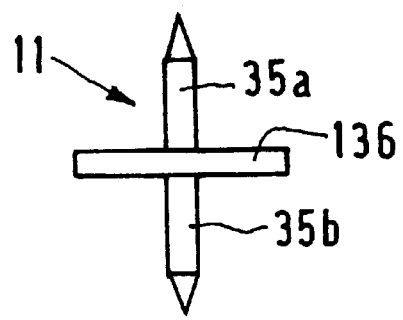

With reference to FIG. 1A, to FIG. 2A in perspective and to FIG. 2B in cross-sectional view, the support means 36 is an elementary surface which may suitably be a washer 136. A pair of pins 35a, 35b extend on either one of the two sides of the washer 136. The pins have ends in the form of points 37 to penetrate and pass through the layers and foils which form the electrochemical cell referenced 21 in this case. The fastening system comprising one or more support elements 136 and one or more pin pairs 35a, 35b referenced 11. For forming a fastening system 11 which exerts a uniformly distributed pressure on the electrochemical cell 21, preferably various support elements 136 with their pins 35a, 35b are distributed over layer 10 in regular fashion.

Figure 3A:
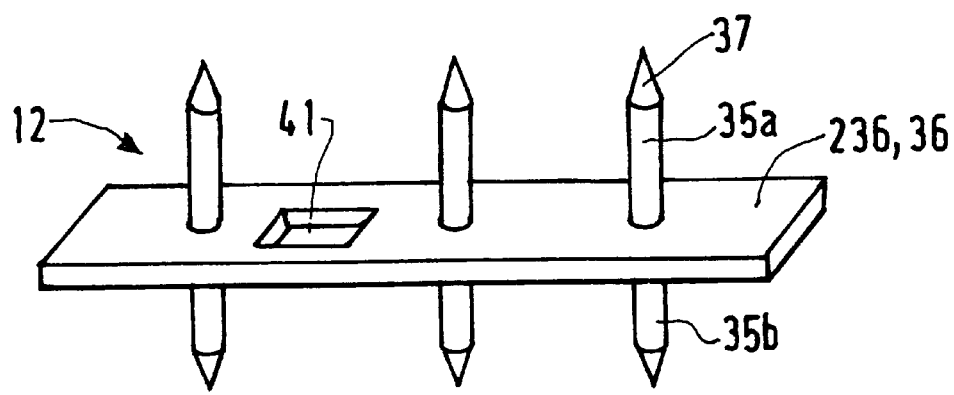
FIGS. 3A, 3B represent respectively in perspective and in cross-sectional view a strip support for pairs of pins, for a mechanical and bonding layer.
Figure 3B:
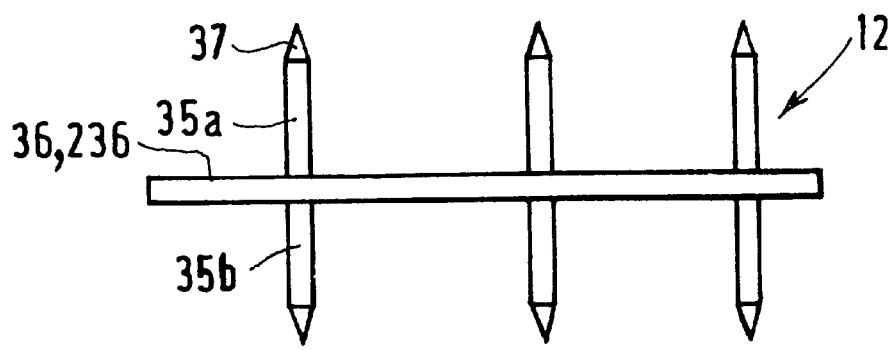

With reference to FIG. 1B and FIG. 3A in perspective view and FIG. 3B in cross-sectional view, the support means 36 is a strip 236 over which are distributed one or various pairs of pins 35a, 35b. For exerting a uniform pressure, the pin pairs are preferably distributed over the strip in regular fashion. The fastening system comprising the strip is referenced 12. The electrochemical cell comprising this fastening system 12 is referenced 22.

Openings 41 for the permeability of the electrolyte may be provided in the strip 236, but not of necessity depending on whether the transverse dimension of the strip permits of the positioning of these openings between pairs of pins.

Figure 4A:
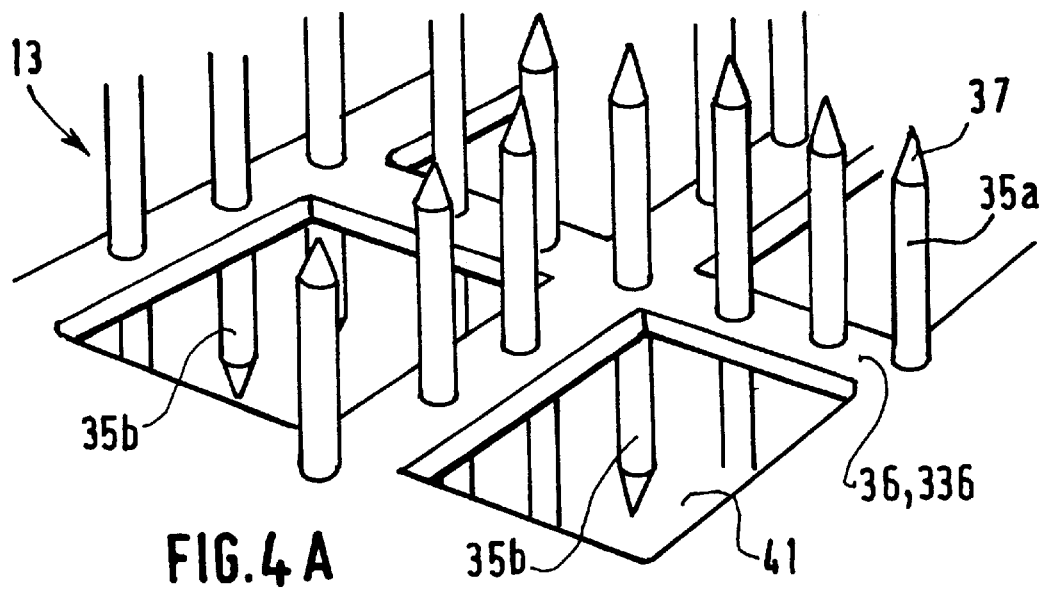
FIGS. 4A, 4B, 4C represent in perspective, in planar and in cross-sectional view respectively a lattice support for pairs of pins, for a mechanical bonding layer.
Figure 4B:
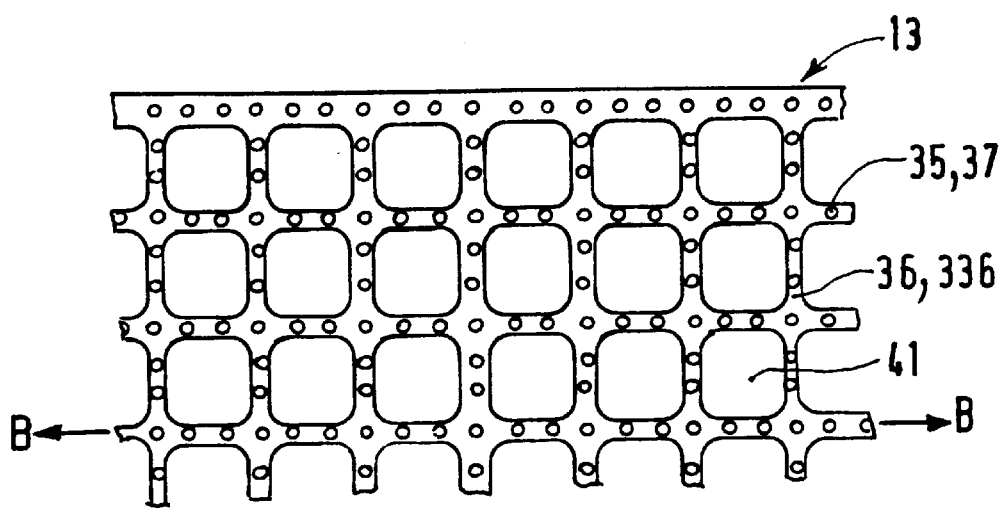
Figure 4C:
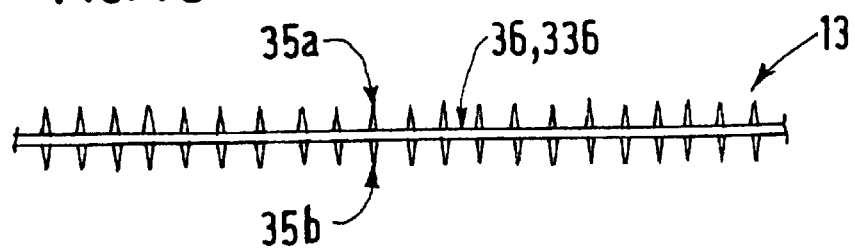

With reference to FIG. 1C, FIG. 4A in perspective view, FIG. 4B in planar view and FIG. 4C in cross-sectional view, the support means 36 is a lattice surface 336 having permeability openings 41 for the electrolyte and over which is or are distributed one or various pairs of pins 35a, 35b. FIG. 4C is a cross-sectional view along axis BB of FIG. 4B. The FIGS. 4 are not on the same scale. The fastening system comprising this lattice surface is referenced 13 and the electrochemical cell comprising this fastening system is referenced 23.

Figure 5A:
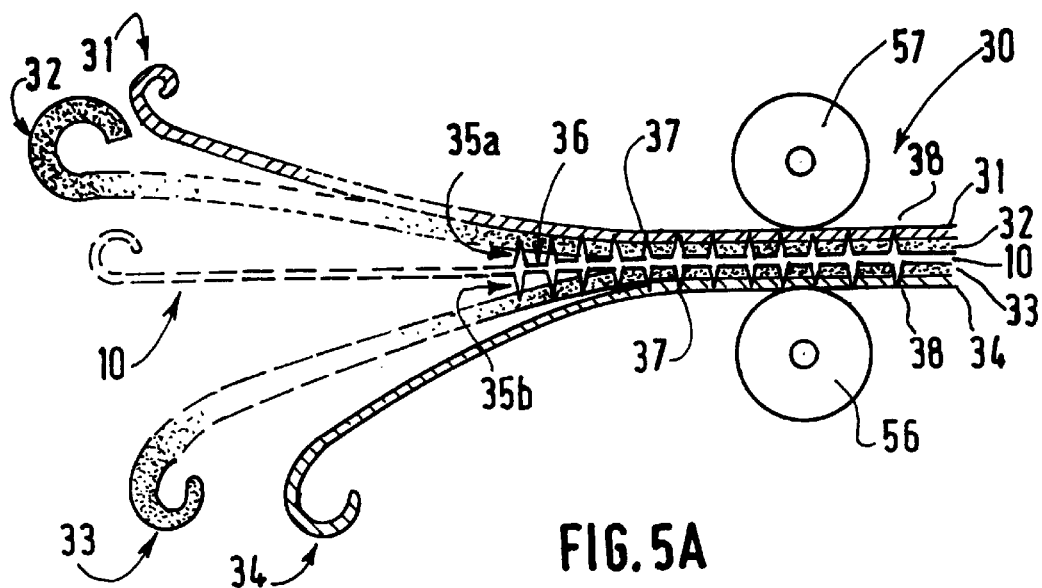
FIGS. 5A, 5B illustrate an embodiment of a precursor element for forming at least one elementary electrochemical cell.

With reference to FIG. 5A in cross-sectional view, a precursor system 30 for realizing one or various elementary electrochemical cells 20a, 20b, 20c which are similar and have a structure such as described in the preceding examples comprises a mechanical bonding layer 10 of non-conductive material in central position and, on either one of the two sides of this central position, a first layer of separator material 32 and an electrode foil 31 and a second layer of separator material 33 and an electrode foil 34 respectively, through which extend the non-conductive pins of the non-conductive support means of the bonding layer to fasten them and press them together.

This precursor system has a surface which is sufficiently large to produce one or various flat elementary electrochemical cells by subdividing C1, C2 of parts 20a, 20b, 20c which comprise each at least one fastening system 11, 12 or 13.

Figure 5B:
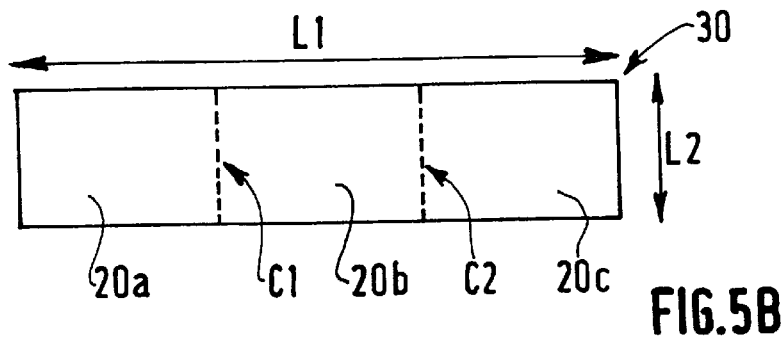

With reference to the FIGS. 5A and 5B, an embodiment of an electrochemical cell of a type 21, 22 or 23 described previously comprises an embodiment step of a precursor element 30 and, occasionally, a step of subdividing the precursor element.

As is shown in FIG. 5A, the precursor element is realized by applying layers 32, 33 of separator material on either one of the two sides of the mechanical bonding layer 10 and then providing electrode foils 31, 34 on either one of the two sides of the layers of separator material. Favorably, these layers come from rollers. In particular the bonding layer 10 may come from rollers of a support means 136, 236, 336. As regards the support element 136, it may be maintained as a roller on a flexible support added at a later instant not used in the electrochemical cell. The other support means may be used as a roller by any means known to a person of ordinary skill in the art. The layers 10, 32, 33, 31, 34 are made similarly in a plane by unrolling the rollers and they are pressed together for example between two or various pressing rods 57, 56. These pressing rods 57, 56 may also have for their function to flatten out the ends 37 of the pins to form the blocking heads 38.

As shown in FIG. 5B, the precursor element has a length L1 and a width L2. In the example of FIG. 5B, the dimensions L1 and L2 are adequate and large enough to form three rectangular electrochemical cells referenced 20a, 20b and 20c by a subdivision along lines C1, C2. Any other mode of use of the surface of the precursor element is possible. It is also possible to realize a single electrochemical cell and various electrochemical cells which have different forms and dimensions.

Figure 6:
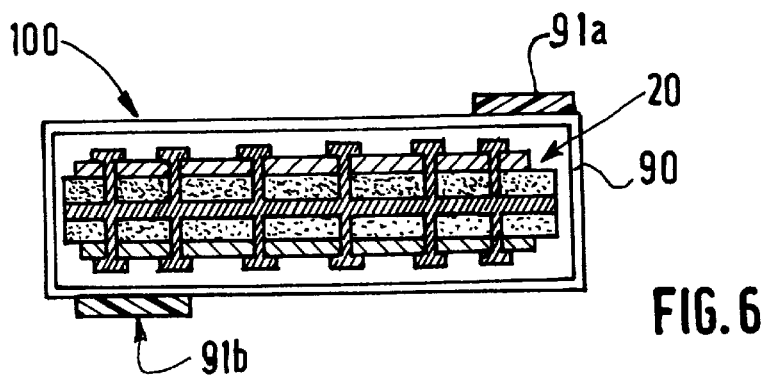
FIG. 6 represents in cross-sectional view a flat accumulator element.

With reference to FIG. 6, in a cross-sectional view, a flat accumulator element 100 is realized in a flat casing 90. A flat casing is meant to be understood as a casing of very small thickness, for example, of the order of 2 mm or less than 2 mm. This casing has electric terminals 91a, 91b having opposite polarities for using the accumulator element in the discharge mode and occasionally in the charge mode. This casing contains at least one flat elementary electrochemical cell according to the invention, for example, of a type 21, 22 or 23, whose electrode foils are connected to the respective electric terminals.

The fastening system according to the invention permits of realizing a flat non-solid electrolyte electrochemical cell. The system particularly permits of realizing a lead-acid electrochemical cell where the electrolyte is, for example, sulfuric acid. The electrolyte acid in liquid form is kept under pressure in the permeable separator material between the electrode foils pressed against the separator material. Thus, the electrode foils are drawn towards the separator material and not pushed by the walls of a casing as this was known previously.

This fastening system offers the advantages of a denser conditioning in a thinner casing; preventing the electrode foils from coming loose from each other in the presence of gas that creates an over-pressure in the casing due to chemical reactions; preventing a deformation of the layers of separator material and electrode foils.

This fastening system further offers the advantages of a simpler and less costly manufacture; preventing the capacity losses which occurred in the case where there was a separation or deformation of electrode foils; reducing the thickness of the electrochemical cell which may drop to below 0.6 mm resulting in a thinner casing whose thickness may go to below 2 mm due to the fact that its walls do not need to be thick to maintain the pressure. In contrast, these walls may be very thin, which considerably reduces the thickness of the casing.

In the manufacture of the flat elementary electrochemical cell according to the invention, the two layers of separator material 32, 33 preferably have the same thickness. Moistening of the layers of separator material with acid results in the fact that the two layers of separator material are pressed against each other and work as a single layer by means of the fastening system.

The parts of the fastening system are made of a material that is non-conductive and non-reactive to the electrolyte acid. The length of the pins 35a, 35b on either one of the two sides of their support means 36 exactly ensures the required pressure. A favorable material for realizing the fastening system is nylon. The support means 36 which is in central position relative to the two pins 35a, 35b ensures that the pressure exerted on each one of the layers 32, 33 of separator material is the same. A regular distribution of the pairs of pins ensures a uniform thickness of the electrochemical cell. Moreover, the fastening system according to the invention makes the use of very thin electrode foils 31, 34 possible.

In an example of embodiment, the support means of the pins in the form of a strip 236 or in the form of a lattice surface 336 is made of a nylon type of plastic material which has a thickness of the order 50 $\mu$m or less. The openings 41 cover a major surface of the strip or of the lattice surface to minimize the influence of the humid surface of layers of separator material shielded by the support means.

A method implemented for subdividing the precursor element 30 into a plurality of elementary electrochemical cells may be a subdivision by means of a mechanical tool, a laser beam or any other method known to the expert.

In the embodiment of the precursor element, the layers of FIG. 5A may further comprise outer protection layers moved by rollers like the other layers and foils. The rollers 56, 57 may occasionally be heating wheels for combining the effect of the pressure and the heat for sealing the ends of the pins to the electrode foils thus forming the blocking heads 38.

An additional advantage may be derived from the fastening system according to the invention: it is possible to realize a cell of a curved shape.

What is claimed is:

1. A flat electrochemical cell comprising:
   a first electrode foil;
   a second electrode foil;
   a first separator layer and a second separator layer of separator material permeable to an electrolyte under pressure located between said first electrode foil and said second electrode foil; and
   a non-conductive fastening system for fastening together said first electrode foil, said second electrode foil, said first separator layer and said second separator layer;
   wherein said non-conductive fastening system comprises at least one non-conductive mechanical bonding layer permeable to the electrolyte and disposed between said first separator layer and said second separator layer, including at least one fastener of non-conductive material for pressing said first electrode foil, said second electrode foil, said first separator layer and said second separator layer against said at least one non-conductive mechanical bonding layer.

2. A cell as claimed in claim 1, wherein said at least one non-conductive mechanical bonding layer comprises a non-conductive support means for said at least one fastener, said at least one fastener being formed by a pair of transverse pins having ends that extend on either one of two sides of said non-conductive support means through said first separator layer, said second separator layer, said first electrode foil and said second electrode foil, said ends of the pair of transverse pins having means for pressing said first electrode foil, said second electrode foil, said first separator layer and said second separator layer against said at least one non-conductive mechanical bonding layer.

3. A cell as claimed in claim 2, wherein said ends of said pair of transverse pins extend beyond outer surfaces of said first electrode foil and said second electrode foil and have flattened heads on said outer surfaces for pressing said first separator layer, said second separator layer, said first electrode foil and said second electrode foil against said at least one non-conductive mechanical bonding layer.

4. A cell as claimed in claim 2, wherein said non-conductive support means comprise at least one elementary surface on which is positioned at least one of said pairs of transverse pins to form the non-conductive fastening system.

5. A cell as claimed in claim 2, wherein said non-conductive support means is formed by a strip on which are distributed at least one of said pairs of transverse pins to form the non-conductive fastening system.

6. A cell as claimed in claim 5, wherein said strip has permeability orifices for the electrolyte, said permeability orifices being disposed between said pairs of transverse pins.

7. A cell as claimed in claim 2, wherein said non-conductive support means is formed by a lattice surface having permeability orifices for the electrolyte and on which are distributed said pairs of transverse pins.

8. A flat accumulator element comprising a casing, electric terminals of opposite polarity and arranged in the casing, at least one flat electrochemical cell according to claim 1 having connection means for connecting said first electrode foil, said second electrode foil and said electric terminals.

9. A precursor element for realizing a flat electrochemical cell, said precursor element comprising:

a first electrode foil;

a second electrode foil;

a first separator layer and a second separator layer of separator material permeable to an electrolyte under pressure located between said first electrode foil and said second electrode foil; and a non-conductive fastening system for fastening together said first electrode foil, said second electrode foil, said first separator layer and said second separator layer;

wherein said non-conductive fastening system comprises at least one non-conductive mechanical bonding layer permeable to the electrolyte and disposed between said first separator layer and said second separator layer, including at least one fastener of non-conductive material for pressing said first electrode foil, said second electrode foil, said first separator layer and said second separator layer against said at least one non-conductive mechanical bonding layer, wherein the at least one non-conductive mechanical bonding layer is in a central position, and on either one of two sides of the central position are said first separator layer and said first electrode foil, and said second separator layer and said second electrode foil, and wherein pins of support means of the at least one non-conductive mechanical bonding layer extend to fasten and press together said first electrode foil, said second electrode foil, said first separator layer and said second separator layer.

* * * * *